United States Patent [19]
Huber et al.

[11] Patent Number: 5,520,095
[45] Date of Patent: May 28, 1996

[54] AUTOMATIC LOADING DISPLAY FOR CATERING EQUIPMENT

[75] Inventors: Peter Huber, Am Steinberg 34 a, D82205 Gilching; Josef Meringer, Puergener Str. 5, D89632 Thalhofen, both of Germany

[73] Assignees: Peter Huber, Gilching; Josef Meringer, Thalhofen, both of Germany

[21] Appl. No.: 275,376

[22] Filed: Jul. 15, 1994

[30] Foreign Application Priority Data

Jul. 17, 1993 [DE] Germany .................. 43 24 015.1

[51] Int. Cl.⁶ ...................................................... A23L 1/00
[52] U.S. Cl. .............................. 99/332; 99/342; 99/448; 99/468
[58] Field of Search ............................. 99/331, 332, 327, 99/333, 342, 344, 335, 448, 468, 467

[56] References Cited

U.S. PATENT DOCUMENTS

| | | | |
|---|---|---|---|
| 3,979,056 | 9/1976 | Barnes | 99/333 |
| 4,346,651 | 8/1982 | Schickendanz | 99/448 |
| 4,920,948 | 5/1990 | Koether et al. | 99/333 |
| 5,097,759 | 3/1992 | Vilgrain et al. | 99/333 |
| 5,188,020 | 2/1993 | Buchnag | 99/335 |

*Primary Examiner*—David Scherbel
*Assistant Examiner*—Reginald L. Alexander
*Attorney, Agent, or Firm*—Hill, Steadman & Simpson

[57] ABSTRACT

Equipment for cooking a plurality of containers of food has parallel rails for defining positions for each container in the cooking chamber, has a sensor arrangement for determining the presence of a container at a position, a timer for receiving the output of the sensor arrangement to start timing of the cooking duration and creating an output signal at the end of the cooking duration which is applied to a display to indicate the completion of the cooking of the particular container in that position.

25 Claims, 3 Drawing Sheets

AUTOMATIC LOADING DISPLAY FOR CATERING EQUIPMENT

BACKGROUND OF THE INVENTION

The present invention is directed to a catering equipment having a plurality of inserts or positions that can be loaded with food to be cooked and that are connected to at least one timer that can be set to a desired cooking time interval.

Traditional catering equipments are designed for cooking all foods to be cooked without time offset and, thus, all foods are completely cooked at the same time. The presence of one time switch is adequate for this purpose, and this time switch comprises a switch and timer. As soon as the catering equipment, such as an oven, has been turned on and has been loaded with food to be cooked at the desired cooking temperature and desired cooking time has been set, the time switch, after the expiration of the cooking time that has been set by the operator, will visually or audibly inform the operator that the completely-cooked foods are to be removed from the catering equipment, such as the oven.

In large-scale catering establishments, whether it is a restaurant or a canteen, there is more and more frequently the need to offer foods that are completely cooked and satisfy high quality standards in adaptation to the individual requests of the patrons at different points in time.

When, however, the inserts of a traditional catering equipment are loaded with food to be cooked differently for different durations of time, then, given the presence of only one time switch, an operator must remember the different cooking times, must write them down or, by repeatedly checking the degree of doneness of the foods, must determine when what food is to be removed from what position in its completely cooked condition. This not only makes high demands on the operating personnel but also is time-consuming and, thus, costly. Moreover, a loss of quality due to excessively long or excessively short cooking can easily occur as a consequence of inattentiveness or overload on the part of the operator.

U.S. Pat. No. 4,920,948, whose disclosure is incorporated herein by reference thereto and which corresponds to European 0 313 768 B1, discloses a parameter control system that comprises a programmed means for the individual setting and control of one or more cooking time intervals at a specific temperature and that can be connected to different cooking apparatus. This parameter control system thus fundamentally enables an "ala carte operation" of a catering equipment wherein different foods are inserted into the catering equipment at different times, depending on the demand. In that there is a possibility of individual setting and controlling of the cooking time intervals of each and every insertion, the integration of this parameter control system into the catering equipment at least makes it possible to overcome some of the disadvantages of the traditional catering equipment that uses a time switch.

Given employment of the parameter control system disclosed in U.S. Pat. No. 4,920,948 in a catering equipment, however, after setting the parameters and loading the positions with the food to be cooked, an operator must press a button allocated to the corresponding position for activating the corresponding timer. It is precisely in large-scale catering establishments, where things are usually hectic and it is not only trained personnel who are employed, however, that it cannot be precluded that the operators of the catering equipment do not press the corresponding button immediately after insertion of the food to be cooked, as a result whereof a substantial reduction in the quality of food can occur.

SUMMARY OF THE INVENTION

The invention is, therefore, based on the object of creating a catering equipment that overcomes the above disadvantages and automatically indicates the loading conditions of each and every position for receiving food.

For achieving this object, the catering equipment of the invention is characterized in that each position for receiving food is connected via a switch to a timer and in that the catering equipment comprises a loading display or load indicator that is connected so that the timer that, in response to loading the position, automatically indicates when the completely-cooked food is to be taken from this position.

It is thereby provided that every position comprises at least one switch for outputting a first signal that, in response to the loading of the position, automatically activates the timer connected to the position and automatically switches an element of the loading display connected to this position from a first condition into a second condition and in that every timer connected to the loaded position outputs a second signal after the time duration that was set has respectively expired. This second signal produces a switching of the respective element of the load being displayed into a third condition. The three different informations can thus be derived from the loading display per position, which one position is not loaded, position is loaded with food to be cooked, and position is loaded with a completely cooked food. The invention also proposes that the first signal occurs when a position is loaded with the food to be cooked and a door of the catering equipment is closed. It is also provided that every switch is activated dependent on the position of the door of the catering equipment.

Alternatively, it is proposed that at least one mechanical auxiliary switch is connected to every switch. This mechanical auxiliary switch is activated dependent on the position of the door of the catering equipment.

It is inventively provided that every position comprises two switched arranged separately from one another, both of which must be activated by the insertion of food to be cooked so that the first signal will occur. The invention also proposes that the switches comprise mechanical switches. The switches also can comprise a light barrier, which includes a light source and detector.

Preferred exemplary embodiments of the invention are characterized by the presence of a microcomputer. The invention also proposes that a temperature sensor be present in the cooking space of the catering equipment. This temperature sensor is connected to the microcomputer so that the time that has been set and is to be counted by the timer and is required for cooking of food can be corrected dependent on the measured temperatures. A moisture sensor can also be provided in the cooking space of the catering equipment. The moisture sensor is connected to the microcomputer so that the moisture in the catering equipment can be optimized.

It is also inventively proposed that the switches are connected to the timer via the microcomputer so that the loss of the heat arising when the door is opened can be compensated. The microcomputer preferably contains the timers.

It is also provided that the loading display is connected to the microcomputer and that the thermal output of the catering equipment can be set dependent on the loading condition.

The invention proposes that every position comprises two rails for accepting a container of food to be cooked. It is thereby inventively provided that the rails are component parts of a rack that can be attached to the inside walls of the catering equipment. Alternatively, it is proposed that the inserts are contained in stationary racks in the catering equipment. It is also possible that the inserts are offered in a movable tray rack carriage. It is also proposed that at least one of the switches that can be switched by the insertion of a container of food to be cooked into the cooking space is arranged at the end of each and every insert rail positioned away from the door of the catering equipment. It is also provided that the switch is arranged in one of two rails defining a position in the rack.

As an alternative, the invention further proposes that a switch is arranged in each rail. The invention provides that the loading display or load indicator can output acoustical signals, that the loading display can output optical signals or output both optical and acoustical signals.

The computer, which acts as a controller or control means, preferably has a keyboard for setting the timers for the desired cooking time. It also is possible that each of the timers or the controllers has a control knob which enables setting of the timer for the desired time.

The invention is based on the surprising perception that, among other things, the respective loading conditions of each and every position is automatically display at any time with a feedback system upon employment of at least one switch, one timer and one element of a loading display per position in the catering equipment.

Other advantages and features of the invention will be readily apparent from the following description of the preferred embodiments, the drawings and claims.

DESCRIPTION OF THE PREFERRED EMBODIMENTS

Figure 1:
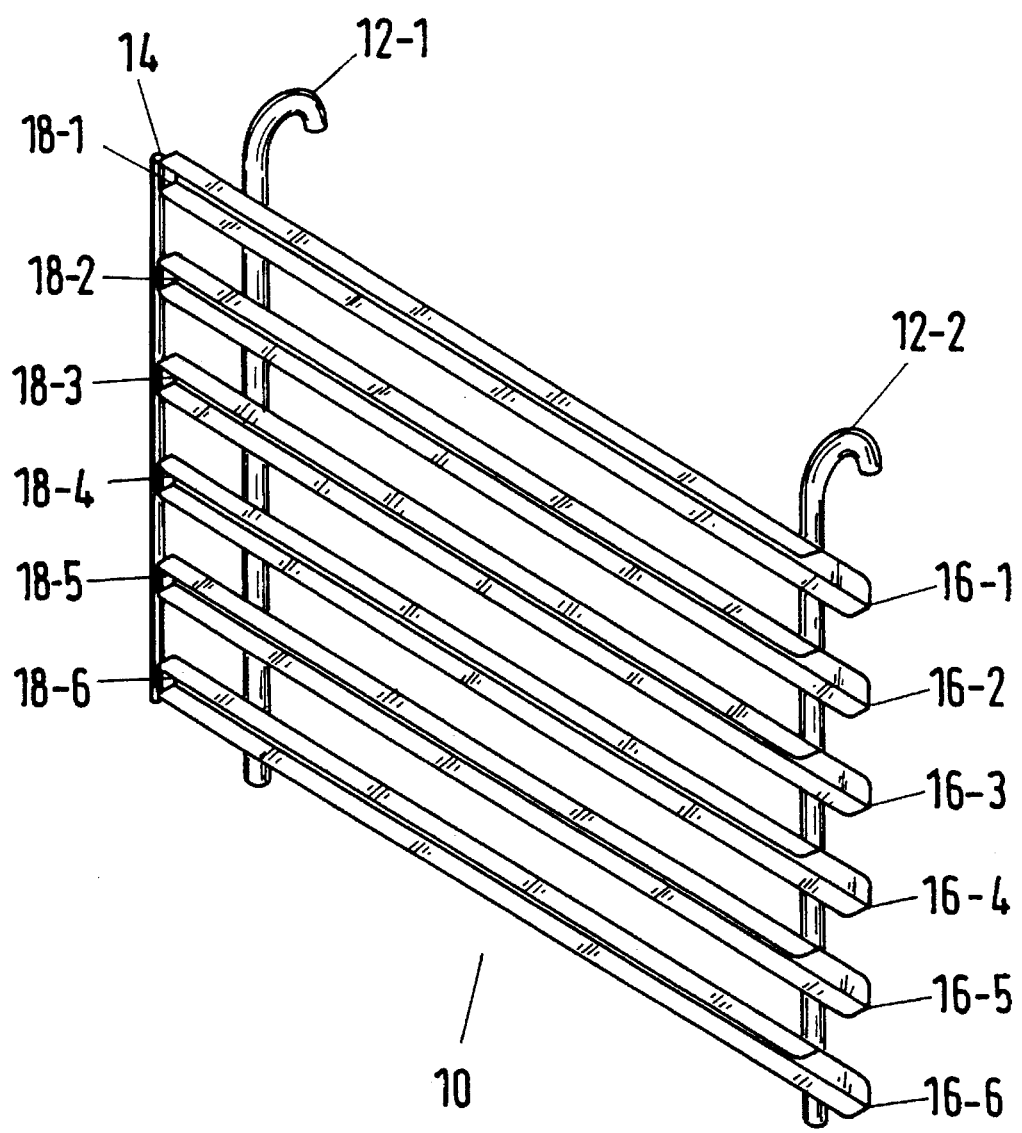
FIG. 1 is a perspective view of one side of a rack in accordance with the present invention which is hooked to the inside wall of a catering equipment, such as an oven.
Figure 2:
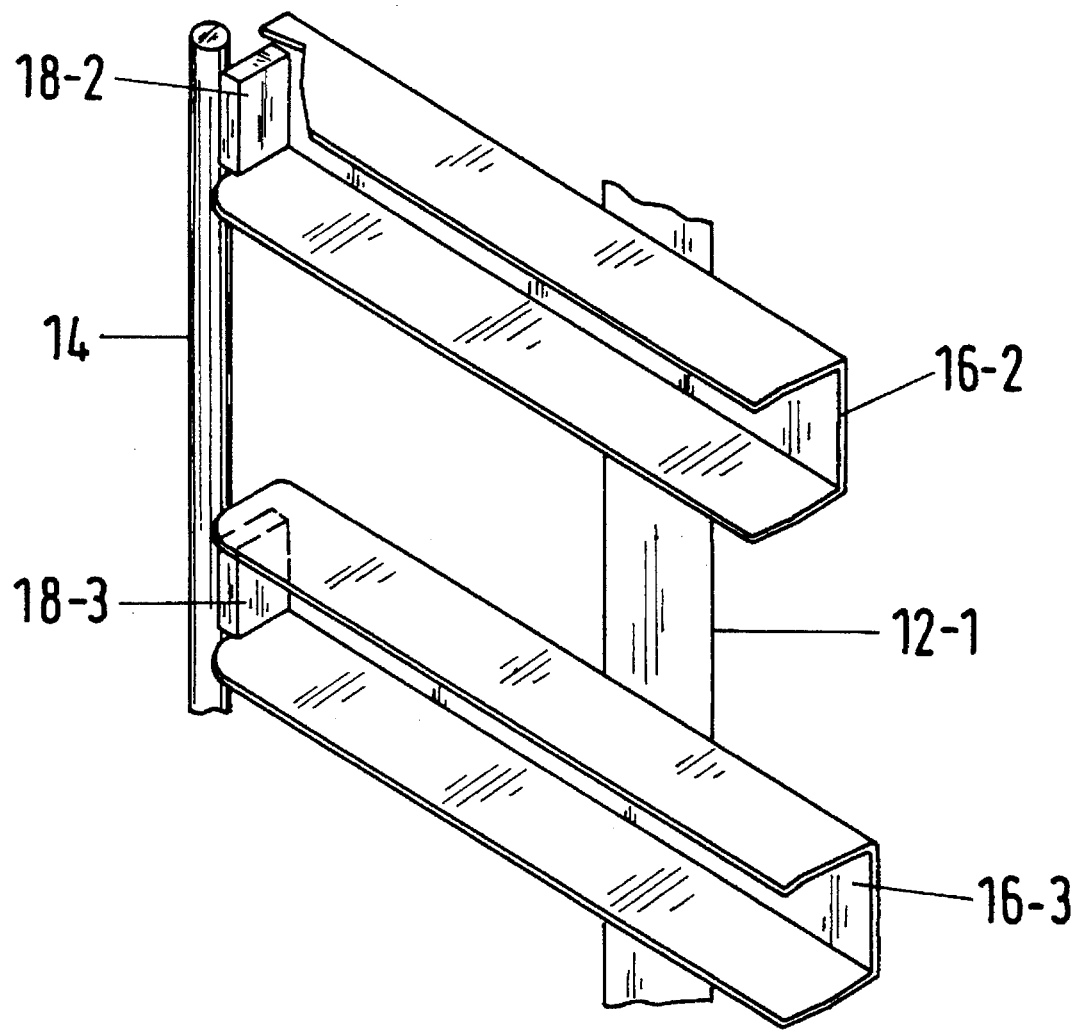
FIG. 2 is an enlarged partial perspective view of one end of the rack of FIG. 1.

FIGS. 1 and 2 show one side of a rack 10 that comprises two hook-shaped rods 12-1 and 12-2 which are arranged parallel to one another, as well as six equally-distanced arranged rails 16-1, 16-2, 16-3, 16-4, 16-5 and 16-6. The rails proceed parallel to one another and transversely relative to the two rods 12-1 and 12-2. When the rack 10 is in the cooking space of a catering equipment, a lead or support rod 14 is arranged to extend parallel to the rods 12-1 and 12-2 on one end of the rack 10. Mechanical switches 18-1 through 18-6 are attached so that they extend from the rod into their respective rails, such as 16-1 through 16-6.

Figure 3:
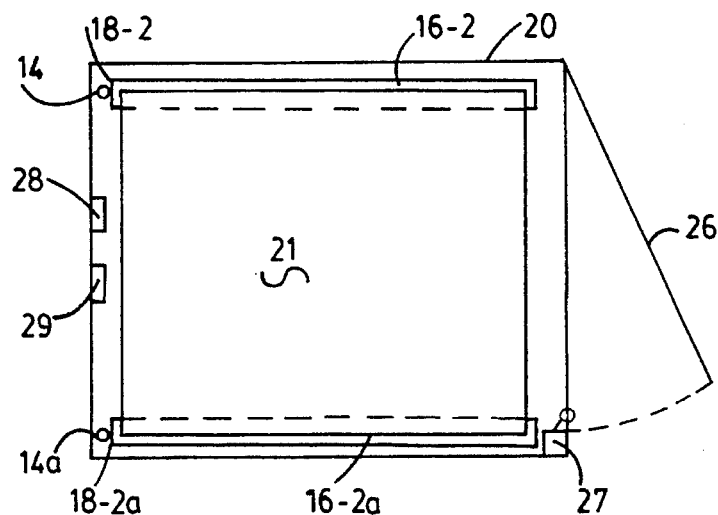
FIG. 3 is a cross sectional view with portions in elevation for purposes of illustration of an oven illustrating the positioning of the rack of FIG. 1 on each side of the oven, with the door being in an opened condition.
Figure 5:
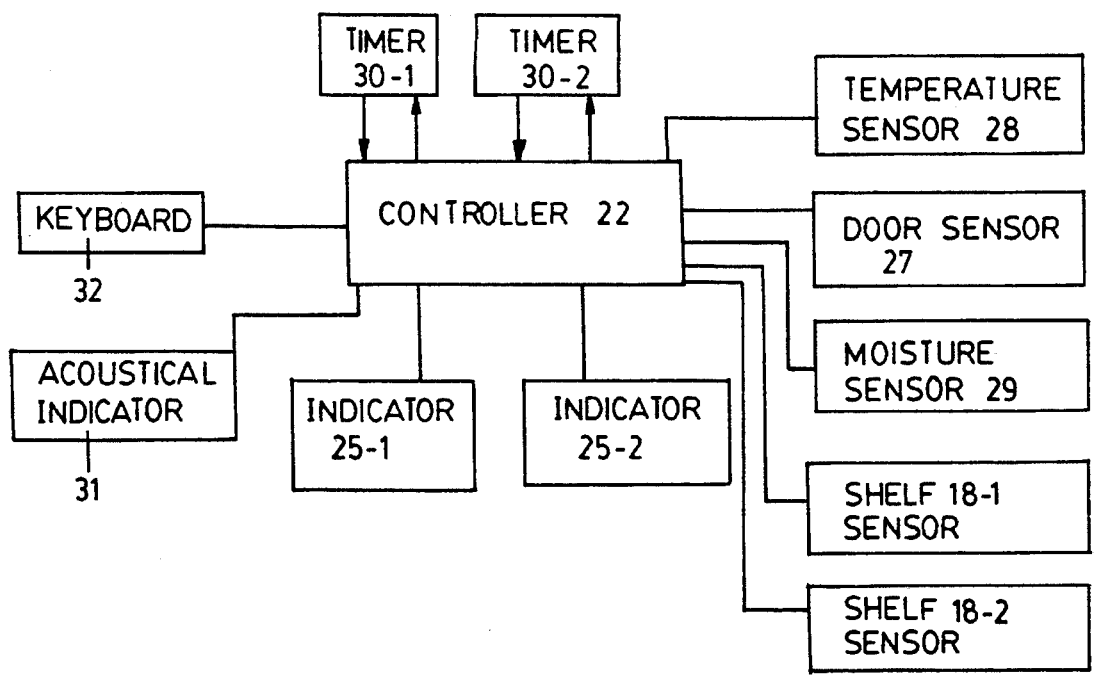
FIG. 5 is a block diagram showing the inputs and outputs of the various indicators, timers and sensors for only two positions.

When a catering equipment, such as an oven 20 of FIG. 3, has a rack 10 attached on each of the inside walls with hook-shaped ends, such as the rods 12-1 and 12-2, then the two racks 10 are mirror-symmetrically constructed relative to one another. The rails, such as 16-2 and 16-2a, will form a position to receive and support a container for food, such as a tray 21, by supporting each edge of the container. Thus, if two racks are applied, each having six rails, such as the rack of FIG. 1, there are six positions and six containers can be received in the oven at the same time. Each of the racks will have the rods, such as 14 and 14a, and these will have the various switches, such as the switch 18-2 for the rail 16-2 and 18-2a for the rail 16-2a. As illustrated in FIG. 3, these switches are arranged near the back end on the inside wall of the oven 20 and are connected to a controller or microcomputer 22 (FIG. 5). FIG. 3 illustrates a switch for each of the rails. Thus, both switches need to be tripped in order to send the signal that a container is received on the two rails. It is possible to have only one switch to sense the presence of the container 21.

The catering equipment or oven 20, in addition to having the rack on each sidewall and their respective switches, such as 18-2, also has a door 26 and a door sensor, such as a microswitch 27. Also, the oven will have a temperature sensor 28 and a moisture sensor 29. As mentioned above, the switches, such as 18-1 and 18-2, form containers or shelf sensors to determine the presence of containers on the rails. These shelf sensors, along with the moisture sensor, the door sensor and the temperature sensor, are all connected to the controller, such as 22, which may be the microcomputer and forms control means. The controller is connected to timers, such as 30-a and 30-2 (only two illustrated), and is also connected to indicators, such as 25-1 and 25-2. In addition, a controller can be connected to an acoustical indictor, such as 31, which can act with or in place of the indicators, such as 25-1 and 25-2. Finally, as illustrated in the block diagram, a keyboard 32 enables inputting information into the controller, such as selected cooking times and temperatures.

The basic functioning of the catering equipment of the present invention is set forth as follows. When no food is present in the catering equipment, this will be determined by the shelf sensors or container sensors formed by the switches, such as 18-1 through 18-6. Then, each of the indicators, such as 25-1 and 25-2, which may include LED displays which will light up green to indicate no food present on any of the six positions formed by the sixth rails of each of the racks. When the door 26 is opened and a container, such as 21, is inserted with food to be cooked on the rails, such as 16-2 and 16-2a, then the container will automatically be sensed by the outputs of the switches 18-2 and 18-2a or 18-2 alone to the controller 22. The controller then will start the timer associated for that particular unit, such as the timer 30-2 and the LED display assigned to the second rail 16-2, which will be part of the indicator 25-2, will light up red as soon as the door of the cooking space is closed. The closing of the door is detected by the microswitch 27, which forms a door sensor. The time corresponding to the cooking time of the introduced food that is to be counted by the second counter or timer, such as the timer 30-2, has already been inputted either by a control knob setting the timer or by the microcomputer. When the second timer has counted the time that was set, then it will output an appropriate signal to the microcomputer which will see to it that the second LED display of the indicator 25-2 will begin flashing green. This flashing will inform the operator that the food introduced between the second rails 16-2 is completely cooked and is to be taken from the oven. When the tray or container 21 has been removed, the microcomputer will be informed of this by the deactivating of the switch 18-2 and then this will, in turn, turn the indicator 25-2 to stop flashing green and now light up with continuous green. It is also possible that, in addition to the indicator 25-2 indicating the finishing of the cooking, the controller will actuate the acoustical indictor 31 to create a chime or buzz to indicate the completion of the cooking cycle.

Assuming that a container is already in the oven and is cooking. Then the operator opens the door 26 of the cooking space to insert an additional container on the first two rails 16-1 and then closes the door. The food previously inserted on the rails 16-2 has not been completely cooked at this time. In response to the signal of the first switch, such as 18-1, the first timer 30-1, which is allocated to the rail 16-1, will be activated by the controller or microprocessor 22. The time to be counted by this timer will correspond to the cooking time of the newly-introduced food which had been previously inputted either via a control knob on the timer or by the keyboard 32 for the controller. An LED display for the indicator 25-1 will switch from the green condition to the red condition.

In addition, the time to be counted by the timer 30-2 will be recalculated and correspondingly corrected in order to compensate for the loss of heat that occurred when the door was open. When this timer has counted the correct time, the display or indicator 25-2 will flash green, whereas the indicator 25-1 will still be in the red condition, since it still has not indicated the completion of the cooking of the later-inserted container. The operators are, thus, automatically informed that only the food introduced on the rails 16-2 has been completely cooked and is now ready to be removed. In response thereto, the operator will open the door of the oven and remove the food from the rails, such as 16-2, and will subsequently close the door. This will lead to the fact that the second display will then indicate green, while the first display 25-1 will still light up red. In order to compensate for the loss of heat that arose when the door was open this time, the time to be counted by the timer 30-1 is recalculated and correspondingly corrected.

As soon as the timer has counted the corrected time, the indicator 25-1 will start flashing green in order to indicate that the food supported on the rails 16-1 has now been completely cooked and is ready to be removed. When the food container on this first position is removed from the oven, all the LED displays will again light with the continuous green, since there are no containers present in the oven.

When the catering equipment of the invention is utilized in a fast food chain, then it essentially only serves the purpose of cooking calibrated foods that, given a specific temperature, all require the same cooking time, as a result whereof the same cooking time is to be inputted to all the timers. When the catering equipment has been switched on and the desired cooking time has been set, every operator can fill the six inserts or positions formed by the six rails with containers for food to be cooked in an arbitrary sequence, and the operator will be automatically informed when completely-cooked food is to be taken from each of the inserts or positions.

Dependent on the loading conditions on how many positions have been filled as well as moisture prevailing within the oven, which is sensed by the sensor 29, the microcomputer or controller 22 can vary the temperature in the cooking space in order to assure the desired quality of the completely-cooked food and in order to save energy. The controller, such as 22, as mentioned above, will adjust the cooking time based on lost heat while the door 22 is opened. Thus, in the above-mentioned example, while cooking the container on the rails 16-2, heat was lost while loading a container onto the position formed by the rails 16-1. Thus, the time of the opening while loading the container into the position formed by the rails 16-1 will need to be compensated. The microcomputer used as the controller can, therefore, automatically adjust the cooking time due to the loss of heat that occurs while the door is opened by sensing the amount of temperature drop and the duration of this temperature drop. Thus, the controller will compensate for both the temperature drop and the duration of the temperature drop caused by opening the door while loading or unloading other containers. In the above example, with six positions formed by the six rails on each of the racks 10, six timers are provided along with six indicators.

Figure 4:
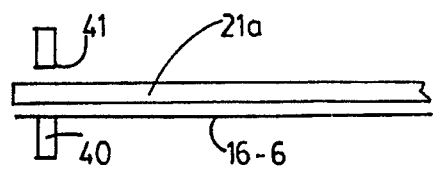
FIG. 4 is a partial side view illustrating a light barrier for determining the presence of a tray or container on a rail of the rack.

The sensors formed by the switches, such as 18-2, were mechanical sensors, such as microswitches. Instead of utilizing mechanical switches, a light barrier, such as illustrated in FIG. 4, can be positioned near the end of each of the rails, such as the rails 16-6 of FIG. 4. The light barrier includes a light source 40 and a light detector 41. The light source can be an LED unit. When a container, such as 21a, is positioned in the space formed by the rail, then the container will block the light from the source 40 and the detector will, thus, indicate the presence of the container 21a.

Although various minor modifications may be suggested by those versed in the art, it should be understood that we wish to embody within the scope of the patent granted hereon all such modifications as reasonably and properly come within the scope of our contribution to the art.

We claim:

1. An apparatus for cooking food having a cooking chamber with a cooking space provided with heat, said chamber being provided with rails forming positions for receiving containers of food, said chamber having a door to enable access to the cooking space, sensor means with each position to determine the presence of a container, programmable timer means receiving signals from the sensor means for each position to measure a time of a cooking interval for a food of a container at each position, to compare a lapsed time of a container at each position with an adjustable duration of cooking time and to generate a signal when the lapsed time reaches said adjustable duration, indicator means for receiving a signal from the timer means to indicate the completion of the cooking time for the food of each container.

2. An apparatus according to claim 1, wherein each of the indicator means indicates a first condition of an absence of a container, a second condition with the presence of a container and a third condition of the completion of the cooking of the food in said container, each sensor means including a switch creating a first signal in response to insertion of a container into the position, said first signal activating the timer means and switching the indicator means from the first condition to the second condition, said timer means emitting a signal after the end of a cooking duration to switch the indicator means from the second condition to the third condition.

3. An apparatus according to claim 2, wherein the first signal arises when the container is loaded with food to be cooked has been inserted and the door of the chamber is closed.

4. An apparatus according to claim 3, wherein each switch of the sensor means is activated dependent on the position of the door of the cooking chamber.

5. An apparatus according to claim 3, which includes door sensing means for determining the position of the door of the equipment and having an output connected to each of the sensor means.

6. An apparatus according to claim 1, wherein each of the sensor means includes two switches arranged separately from one another, both being activated by insertion of a container of food into the position.

7. An apparatus according to claim 1, wherein each of the sensor means includes a mechanical switch.

8. An apparatus according to claim 1, wherein each of the sensor means comprises a light barrier having a sensor arranged relative to a light source being blocked by the presence of the container in the respective position.

9. An apparatus according to claim 1, which includes control means for receiving inputs from the sensor means, the timer means and transferring signals to the indicator means.

10. An apparatus according to claim 9, wherein a temperature sensing means is present in the cooking space, said temperature sensing means being connected to the control means so that time required for cooking food that was set in the control means can be corrected dependent on the measured temperature.

11. An apparatus according to claim 9, which includes moisture sensor means in the cooking chamber having an output connected to the control means to enable optimizing the desired moisture within the cooking chamber.

12. An apparatus according to claim 9, wherein the control means senses temperature drops during opening of the door of the cooking chamber and compensates for loss of heat by changing the duration for each of the timer means.

13. An apparatus according to claim 9, wherein the control means is a microcomputer containing the timer means.

14. An apparatus according to claim 9, wherein the control means can control the temperature in the cooking chamber.

15. An apparatus according to claim 1, wherein each position is defined by a pair of space rails.

16. An apparatus according to claim 15, wherein the pair of space rails are part of a pair of racks positioned adjacent the inside wall of the chamber.

17. An apparatus according to claim 16, wherein each of the racks is a stationary rack in the chamber.

18. An apparatus according to claim 16, wherein each of the racks is a movable tray rack on a carriage.

19. An apparatus according to claim 1, wherein each of the sensor means includes a switch positioned on the end of a rail opposite the door of the cooking chamber with the switch being actuated by receiving a container of food on the rail.

20. An apparatus according to claim 19, wherein one switch is provided for each position defined by a pair of rails.

21. An apparatus according to claim 20, wherein a switch is arranged on each rail of each pair of rails defining a position.

22. An apparatus according to claim 1, wherein the indicator means includes means to produce acoustical signals.

23. An apparatus according to claim 1, wherein the indicator means produces optical signals.

24. An apparatus according to claim 1, which includes control means with a keyboard for inputting desired cooking times for each of the timer means.

25. An apparatus according to claim 1, which includes control means with control knobs for setting the cooking times for each of the timer means.

* * * * *